J. WAMBSGANS.
HINGE JOINT FOR ARTIFICIAL LEGS.
APPLICATION FILED SEPT. 29, 1911.
1,069,209.
Patented Aug. 5, 1913.
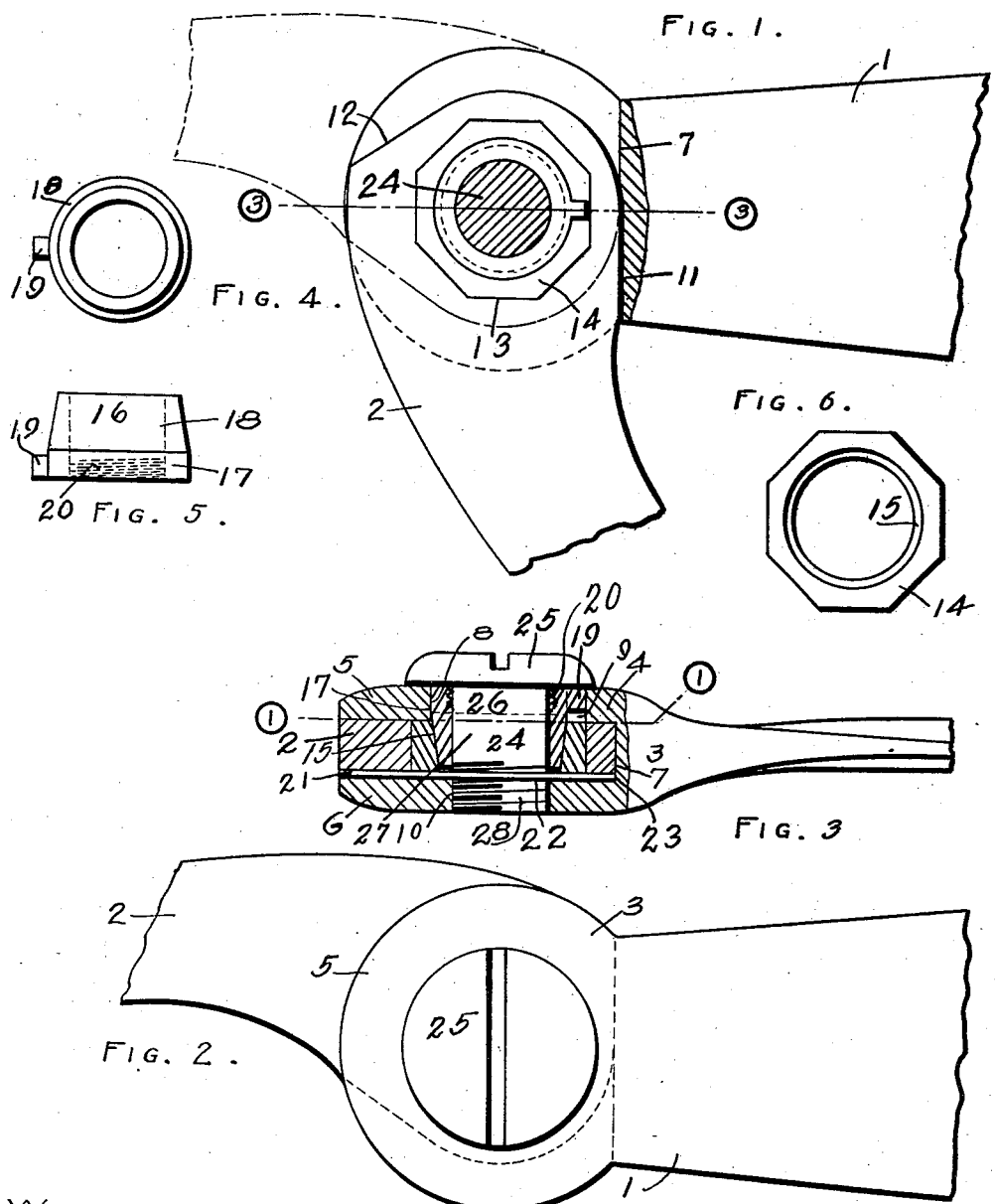
WITNESSES.
J. W. Naylor.
E. M. Barnhardt
INVENTOR.
Jacob Wambsgans.
By La Porte & Bean
Attys.

UNITED STATES PATENT OFFICE.

JACOB WAMBSGANS, OF PEORIA, ILLINOIS.

HINGE-JOINT FOR ARTIFICIAL LEGS.

1,069,209.   Specification of Letters Patent.   Patented Aug. 5, 1913.

Application filed September 29, 1911. Serial No. 652,026.

*To all whom it may concern:*

Be it known that I, JACOB WAMBSGANS, a citizen of the United States, residing at Peoria, in the county of Peoria and State of Illinois, have invented certain new and useful Improvements in Hinge-Joints for Artificial Legs, of which the following is a specification.

This invention relates to improvements in hinge joints particularly for use as the knee joint in artificial legs.

The principal object of this invention is the provision of a joint, which is composed of few parts, is simple in construction, easy to adjust and in which the wearing parts may be replaced with facility.

A further object of this invention is the provision of a joint which may be used for either "shin-bearing" or "knee-bearing" artificial legs, being particularly well adapted for the latter as the joint may be entirely assembled from the outside.

To the accomplishment of the foregoing and such other objects as may hereinafter appear, my invention consists in the construction, combination and arrangement of parts hereinafter described and then sought to be defined in the appended claims, reference being had to the accompanying drawing which illustratively discloses a preferred embodiment of my invention, it being understood, however, that the detailed construction and arrangement of parts may be varied within the scope of the claims without digressing from my inventive idea.

In the drawing, in which like characters of reference designate corresponding parts, Figure 1 is a side elevation of the outside of the joint, enlarged, parts being broken away on line 1—1 Fig. 3, and the extended position of one member being indicated in dotted lines. Fig. 2 is a side elevation of the joint, taken from the outside. Fig. 3 is a sectional view taken substantially on line 3—3 of Fig. 1. Fig. 4 is an end view of the removable bushing or sleeve. Fig. 5 is a side elevation thereof. Fig. 6 is a detail view of the hardened bushing.

In the embodiment of my invention which is illustrated, 1 designates the strap or iron constituting one member of the joint and 2 the strap or iron forming the other member. The member 1 is formed at its extremity with a circular portion 3 which is forked or bifurcated as at 4 to form the two circular bearing members or plates 5 and 6 which are spaced apart, as shown, an abutment or shoulder 7 being formed at their junction with the member 1. The upper circular bearing member or plate 5 is provided with a circular opening or aperture 8 which is centrally located and has the cutout slot or recess 9 in its edge. The lower circular bearing member or plate 6 has an internally screw threaded circular opening or aperture 10 which is concentric with the aperture 8 but smaller in diameter.

The member 2 of the joint has its extremity enlarged and of eccentric shape having the two flattened edges 11 and 12, which are adapted to engage the abutment or shoulder 7 when the joint is bent and extended, respectively, to limit the extent of movement of the parts relatively to each other in either direction. In the extremity of the member 2 is provided an opening or recess 13, which is preferably polysided, and in which is secured a bushing 14. This bushing is of hardened tool steel and is secured in the opening in any manner desirable and suitable. The inner surface 15 of the bushing is formed or shaped on an inclination, so that the bearing surface thereof is frustoconical and forms a tapering recess.

A removable sleeve or bushing 16 which is of hardened steel is provided with a flat circular bearing portion 17, which is designed to fit the aperture 8 of bearing member or plate 5, and is also provided with an inclined bearing portion or surface 18, which is of frusto-conical or tapering shape to fit the frusto-conical opening in the bushing 14. A locking lug or projection 19 extends from the portion 17 and is designed to fit into the recess 9 and lock the removable sleeve or bushing in place in the member or plate 5. This sleeve or bushing is centrally bored as shown, part of said bore being internally threaded, as indicated at 20, for the reception of a bolt or tool to facilitate its removal. A fiber washer 21 is placed between the bearing member or plate 6 and the extremity of member 2, being provided with the aperture 22 and the straight edge 23 to abut the shoulder 7. The assembling bolt 24 has the enlarged head 25 and the stud 26, which has the smooth portion 27 and the threaded portion 28, the former fitting in the removable bushing 16 and the latter in the bearing member or plate 6.

The joint is assembled as described and shown, the washer 21 being placed on the bearing member or plate 6 with its straight edge bearing against the abutment or shoulder 7. The extremity of the member 2 having the hardened bushing therein is inserted in the bifurcated end of member 1 between the bearing members or plates 5 and 6. Then the removable sleeve or bushing is dropped into position, the frusto-conical portion thereof engaging the inclined aperture 15 in the bushing 14, and the portion 17 of the removable sleeve or bushing fitting in the aperture 8 of the bearing member or plate 5, with the lug or projection 19 fitting in the recess 9. The bolt 24 is then passed through the bore of the removable sleeve or bushing 16, through the aperture 22 of the washer 21 and is screwed into the screw threaded aperture 10 in the bearing member or plate 6.

By this particular manner of constructing and assembling the joint, the parts may be adjusted to any degree of tightness desired and thus make the hinge movement of the members easy or difficult, at the same time always holding them rigid in regard to any lateral movement, thus preventing any noise or rattling or any loose movement. By using the bushing 14 which is of very hard steel, and the removable sleeve or bushing 16, there is only a very small amount of wear extended over a long period of time, the pressure being distributed over the conical surfaces. This may be readily compensated for by adjustment for a considerable time, and when this fails to produce the desired results these parts may be readily replaced, the bushing 14 being removed and a new one put in and a new removable sleeve or bushing 16 being substituted for the old one. The fiber washer 21 reduces the wear on the metallic parts and may be readily replaced. It is to be noticed that, in use, owing to the inclination of the bearing surfaces of the bushings practically all of the end thrust or wear will come on the fiber washer, as it is located at the end of the inclination of the bearing surfaces, and as the extremity of one of the members 1 or 2 will be forced down the inclination the washer will receive the larger part of the wear and tear. As this washer may be readily and inexpensively replaced, this is a manifest advantage.

It is obvious then that I have provided a joint of the character described wherein the parts which receive the wear are treated and hardened to withstand it to the greatest extent, which parts however are capable of ready replacement.

The joint is peculiarly adapted for use as a "knee-bearing" joint, as it is entirely assembled and adjusted from the one side. There is no lateral or lost motion and consequently no clicking or rattling. Ready adjustment is provided for in the construction shown and described. It is of few parts, simple in construction, cheap to manufacture, and the parts are capable of withstanding heavy wear and may be readily and inexpensively replaced.

What I claim is:—

1. A hinge joint for artificial limbs, comprising a member having spaced bearing members or plates, said spaced bearing members or plates having apertures formed therein, a second member having an aperture therein tapering in one direction, said second member adapted to be positioned between said spaced bearing members or plates, a removable sleeve or bushing having a portion tapering in one direction to fit said tapering aperture, and adjustable means passing through said aperture and said removable sleeve or bushing to hold said parts together.

2. A hinge joint for artificial limbs, comprising a member having spaced bearing members or plates at its extremity, said spaced bearing members or plates having apertures formed therein, a second member having a tapering aperture and adapted to be positioned between said spaced bearing members or plates, an integral removable bushing or sleeve having a cylindrical portion to fit the aperture in one of said spaced bearing members or plates, said removable bushing or sleeve also having a tapering portion to fit said tapering aperture, and adjustable means passing said apertures and said removable sleeve or bushing to hold said parts together.

3. A hinge joint for artificial limbs, comprising a member having spaced bearing members, or plates, said spaced bearing members or plates having apertures formed therein, one of said apertures being smaller than the other and being screw threaded, the other and larger aperture having a slot or recess in its edge, a second member having a tapering aperture therein and adapted to be positioned between said spaced bearing members or plates, a removable sleeve or bushing having a tapering portion to fit said tapering aperture, said removable sleeve or bushing also having a cylindrical portion to fit said larger aperture in one of said spaced bearing members or plates, a lug or projection extending from said cylindrical portion of said removable sleeve or bushing adapted to enter said slot or recess to hold the removable sleeve or bushing against rotation in said bearing member or plate, and a bolt adapted to pass through said apertures and said removable sleeve or bushing and having a screw threaded portion adapted to engage said smaller screw-threaded aperture to hold the parts together.

4. A hinge joint for artificial limbs, comprising a member having spaced bearing members or plates, said spaced bearing members or plates having apertures formed therein, a second member having a hardened steel bushing inserted therein and adapted to be positioned between said spaced bearing members or plates, a removable sleeve or bushing held in the aperture in one of said spaced bearing members or plates and engaging said hardened bushing, and means passing through said apertures and said removable sleeve or bushing to hold the parts together.

5. A hinge joint for artificial limbs, comprising a member having spaced bearing members or plates, said spaced bearing members or plates having apertures therein, a second member adapted to be positioned between said spaced bearing members or plates and having a hardened bushing inserted therein, said bushing having a tapered or frusto-conical opening therethrough, a removable sleeve or bushing having a tapered portion to fit said tapered or frusto-conical opening in said hardened bushing, and means passing through said apertures and said removable sleeve or bushing to adjustably hold the parts together.

6. A hinge joint for artificial limbs, comprising a member having spaced bearing members or plates, said spaced bearing members or plates having apertures formed therein, one of said apertures being smaller than the other and screw threaded, a second member having a hardened polysided bushing inserted therein, said bushing having a tapered or frusto-conical opening or aperture therein, said second member adapted to be positioned between said spaced bearing members or plates, a removable sleeve or bushing having a cylindrical portion adapted to fit the aperture in one of said spaced bearing members or sleeves and a tapered or frusto-conical portion adapted to fit said tapered or frusto-conical opening or aperture, a washer adapted to be placed between the smaller end of the removable sleeve or bushing and said second member on the one hand, and one of said spaced bearing members or plates on the other hand, and a bolt passing through said apertures and said removable sleeve or bushing and having a screw threaded portion adapted to engage said screw threaded aperture to adjustably hold the parts together.

In testimony whereof I affix my signature, in presence of two witnesses.

JACOB WAMBSGANS.

Witnesses:
GEORGE T. BEAN,
E. M. BARNHARDT.

Copies of this patent may be obtained for five cents each, by addressing the "Commissioner of Patents, Washington, D. C."